United States Patent
Kojima

(10) Patent No.: US 7,673,328 B1
(45) Date of Patent: Mar. 2, 2010

(54) NETWORK AUTHENTICATION SYSTEM USING INDIVIDUAL SERVICES PROVIDERS AND AN AUTHENTICATION SERVER

(75) Inventor: Akitoshi Kojima, Utsunomiya (JP)

(73) Assignee: Kojima Co., Ltd., Tochigi (JP)

( * ) Notice: Subject to any disclaimer, the term of this patent is extended or adjusted under 35 U.S.C. 154(b) by 0 days.

(21) Appl. No.: 09/555,233

(22) PCT Filed: Sep. 28, 1999

(86) PCT No.: PCT/JP99/05290

§ 371 (c)(1), (2), (4) Date: Jul. 13, 2000

(87) PCT Pub. No.: WO00/19323

PCT Pub. Date: Apr. 6, 2000

(30) Foreign Application Priority Data

Sep. 28, 1998 (JP) .................................. 10-274082

(51) Int. Cl.
*H04L 9/32* (2006.01)
*H04L 9/00* (2006.01)
*G06F 7/04* (2006.01)
*G06F 15/173* (2006.01)
*H04K 1/00* (2006.01)
*H04Q 7/20* (2006.01)

(52) U.S. Cl. .................... 726/6; 726/2; 726/7; 713/182; 380/248; 709/225; 455/432.1

(58) Field of Classification Search ................ 713/200, 713/201, 202
See application file for complete search history.

(56) References Cited

U.S. PATENT DOCUMENTS

| 5,608,778 | A | * | 3/1997 | Partridge, III | 379/58 |
| 5,740,361 | A | * | 4/1998 | Brown | 726/5 |
| 5,745,884 | A | * | 4/1998 | Carnegie et al. | 705/34 |
| 5,748,736 | A | * | 5/1998 | Mittra | 713/163 |
| 5,872,523 | A | * | 2/1999 | Dellaverson et al. | 340/825.52 |

(Continued)

FOREIGN PATENT DOCUMENTS

EP WO 920467 3/1993

(Continued)

OTHER PUBLICATIONS http://web.archive.org/web/*/http://www.hotmail.com.*

(Continued)

*Primary Examiner*—Ayaz Sheikh
*Assistant Examiner*—Aravind K Moorthy
(74) *Attorney, Agent, or Firm*—Lackenbach Siegel, LLP; Myron Greenspan

(57) ABSTRACT

A network system includes a plurality of individual Internet service providers each having access points, and a parallel Internet service provider connected to the plurality of individual Internet service providers, the individual Internet service providers and the parallel Internet service provider each include an authentication server. When the access point of a provider receives a connection request from a user who contracts with the parallel service provider, the provider transfers a connection ID and a password to an authentication server of the parallel Internet service provider to perform user authentication. When a result of the authentication is good, the user terminal is connected to the user terminal through the access point.

4 Claims, 3 Drawing Sheets

U.S. PATENT DOCUMENTS

| | | | | |
|---|---|---|---|---|
| 5,898,780 | A * | 4/1999 | Liu et al. | 713/155 |
| 6,016,428 | A * | 1/2000 | Diachina et al. | 455/435.1 |
| 6,058,301 | A * | 5/2000 | Daniels | 455/411 |
| 6,058,309 | A * | 5/2000 | Huang et al. | 455/433 |
| 6,070,067 | A * | 5/2000 | Nguyen et al. | 455/407 |
| 6,144,959 | A * | 11/2000 | Anderson et al. | 707/9 |
| 6,182,136 | B1 * | 1/2001 | Ramanathan et al. | 709/224 |
| 6,219,790 | B1 * | 4/2001 | Lloyd et al. | 726/14 |
| 6,282,575 | B1 * | 8/2001 | Lin et al. | 709/244 |
| 6,393,482 | B1 * | 5/2002 | Rai et al. | 709/225 |
| 6,502,192 | B1 * | 12/2002 | Nguyen | 726/4 |
| 6,535,517 | B1 * | 3/2003 | Arkko et al. | 370/401 |
| 6,636,502 | B1 * | 10/2003 | Lager et al. | 370/352 |
| 6,675,208 | B1 * | 1/2004 | Rai et al. | 709/224 |
| 6,907,254 | B1 * | 6/2005 | Westfield | 455/456.4 |
| 7,188,360 | B2 * | 3/2007 | Gerdes et al. | 726/4 |
| 2001/0052006 | A1 * | 12/2001 | Barker et al. | 709/223 |

FOREIGN PATENT DOCUMENTS

| | | |
|---|---|---|
| EP | 0 686 905 A1 | 5/1995 |
| EP | 0 695 985 A1 | 7/1995 |
| EP | 0 695 985 | 2/1996 |
| EP | 0 686 905 | 9/1996 |
| EP | 1186984 A2 * | 3/2002 |
| EP | 1298952 A2 * | 4/2003 |
| EP | 1365621 A1 * | 11/2003 |
| JP | 7-200479 | 8/1995 |
| JP | 8-106436 | 4/1996 |
| JP | 9-81518 | 3/1997 |
| JP | 9-081518 | 3/1997 |
| JP | 10-089980 | 4/1998 |
| JP | 10-89980 | 4/1998 |
| JP | 10-105516 | 4/1998 |
| JP | 10-111847 | 4/1998 |
| JP | 10-164272 | 6/1998 |
| JP | 10-215284 | 8/1998 |
| JP | 11-3317 | 1/1999 |
| JP | 11-003317 | 1/1999 |
| JP | 11-149451 | 6/1999 |
| JP | 11-155030 | 6/1999 |
| WO | WO 92/04671 | 3/1992 |
| WO | WO03092190 A1 * | 11/2003 |

OTHER PUBLICATIONS

Lee et al, User Authentication Mechanism Using Authentication Server in Home Network, 2006, IEEE, pp. 503-506.*

Li Gong, Increasing Availability and Security of an Authentication Service, 1993, IEEE, pp. 657-662.*

Reiner Kraft, Designing a Distributed Access Control Processor for Network Services on the Web, 2002, ACM, pp. 36-52.*

Li et al, Access Control for the Services Oriented Architecture, 2007, ACM, pp. 9-17.*

Shigeo Morimoto, Practical Lecture of EC Business: O&A to Success in Electronic Mall 5, Nikkei Business Publications, Inc., Japan, Sep. 15, 1998, No. 39, pp. 204-208.

Introduce the Most Advanced Utilization Method of Evolving Point System, CardWave, Japan, C. Media Co., Ltd., Jun. 10, 1998, vol. 11, No. 7, pp. 20-21.

Hideyuki Yamada, Technique of User Authentication for Remote Connection, Nikkei Communication, Japan, Nikkei Business Publications Inc., Aug. 5, 1996, No. 227, pp. 124-131.

* cited by examiner

FIG. 2  X02AT4375@PATENT.COM

KOJIMA@00.PARALLELNET.COM
↓
KOJIMA@01.PARALLELNET.COM
↓
KOJIMA@99.PARALLELNET.COM

NETWORK AUTHENTICATION SYSTEM USING INDIVIDUAL SERVICES PROVIDERS AND AN AUTHENTICATION SERVER

CROSS-REFERENCE TO RELATED APPLICATIONS

This is a National Phase Application under 35 U.S.C. §371 Of Application PCT/JP/99/05290, filed Sep. 28, 1999.

This application is based upon and claims the benefit of priority from the prior Japanese Patent Application No. 10-274082, filed Sep. 28, 1998, the entire contents of which are incorporated herein by reference.

BACKGROUND OF THE INVENTION

The present invention relates to a network system such as the Internet and, more particularly, to user authentication required when a user connects with a network.

Recently, electronic mail, information providing service, and network shopping using the Internet have been widely performed in accordance with the widespread use of personal computers and the maintenance and expansion of network environment.

A user has to connect a user terminal to the Internet in order to send and receive e-mail, browse information, and do network shopping. It is however difficult for the user to directly connect the user terminal to the Internet. Usually he or she connects the terminal thereto through an access point of an Internet service provider.

The above connection states will be described with reference to FIG. 1. Access points (APs) $4A_1, 4A_2, \ldots; 4B_1, \ldots$ proper to Internet service providers (ISPs) 6A, 6B, . . . are connected to the Internet 2. In most cases, the Internet connect rate depends on connect time regardless of distance, whereas the connect rate between an access point AP and a user terminal is based on an ordinary telephone charge system. It is thus general that the access point AP is located for each area (area code) in order to lower a user charge. The Internet service provider ISP is constituted of an authentication server, a mail server, a domain name server, a gateway and the like. A WWW server 10 for providing a home page is also connected to the Internet 2.

The access points APs have a function of connecting user terminals $8A_1, 8A_2, \ldots$, which make a contract with their respective providers, to the Internet 2. If an access request is issued from a user terminal, the provider performs authentication using the authentication server to determine whether the user who is gaining access to the Internet is a regular one or not under contract with the provider. The user terminals $8A_1, 8A_2, \ldots$ under contract can be connected to the Internet through the access points $4A_1, 4A_2$, whereas they cannot be done through the access point $4B_1$ of Internet service provider 6B because they do not contract themselves to the provider 6B.

Recently, various types of portable user terminal have been developed. Not only a user uses a terminal fixedly installed in an office, but also he or she sometimes wish to get access to the Internet using a portable terminal even when he or she is out or on a business trip. If there are no access points of an Internet service provider to which a user makes a contract near the user, he or she has to connect his or her terminal to the Internet through a remote access point. Since, in this case, a telephone charge increases, the user wishes to temporarily utilize an access point of another nearby Internet service provider to connect with the Internet. Even though an access point of an Internet service provider to which a user makes a contract is near the user, if the access point is busy, he or she wishes to temporarily utilize an access point of another Internet service provider to connect with the Internet. The Internet connection capabilities of Internet service providers are not uniform but vary from provider to provider. It is thus desired that an Internet service provider be selected according to its intended use. When an access point of an Internet service provider to which a user makes a contract is busy, it is sometimes preferable that the user temporarily uses an access point of another Internet service provider.

Conventionally, in order to count the above problem, each user had to contract with a few Internet service providers on an individual basis and pay a basic rate for each provider regardless of whether it was used or not, which became a significant economical burden to the user. What a user contracts with a plurality of Internet service providers means that a plurality of user IDs (electronic mail addresses) and a plurality of passwords are set. In addition to the economical problem, there were a number of inconveniences in which a user had to set a user terminal (dialup connection) for each Internet service provider and could not manage the mail in a batch because of a plurality of mail addresses.

In a conventional electronic mail address, as shown in FIG. 2, alphanumerics X02βT4375 were arranged as a user name before a domain name PATENT.COM (to the left of the @ sign) in accordance with the provisions of an Internet service provider. Such an unfamiliar, hard-to-remember user name was automatically added to the mail address. Though a user name can be registered as he or she wishes, if the same user name has been registered, the user has to prepare another user name and register it again, which is a very troublesome operation.

An object of the present invention is to provide a network system in which a user is able to connect with a network selectively using access points of a number of Internet service providers only if the user contracts with one Internet service provider.

Another object of the present invention is to provide an Internet connection apparatus capable of connecting with a network by performing user authentication even at the request of not only a regular user contracting with a provider but also a user contracting with another provider cooperating with the provider of the regular user.

Still another object of the present invention is to provide an electronic mail address determination system capable of providing a user with an electronic mail address including a user name as the user wishes.

BRIEF SUMMARY OF THE INVENTION

In a network system according to the present invention comprising a plurality of individual service providers each having own access points, and a parallel service provider connected to the plurality of individual service providers and including an authentication server, when the access point of the individual service providers receives a connection request from a user who contracts with the parallel service provider, the individual service provider causes the authentication server to perform user authentication and connect the user to a network through the access point in accordance with a result of the authentication.

Preferably, the user who contracts with the parallel service provider sends a connection request containing a domain name of the parallel service provider to the access point, and the access point determines whether the user contracts with the parallel service provider in accordance with presence or absence of the domain name. The parallel service provider is connected to the plurality of individual service providers through an exclusive line. The plurality of individual service providers send respective user connection recordings to the parallel service provider.

A network connecting method according to the present invention comprises sending a connection request from a user to an access point of any one of a plurality of individual service providers, determining by the access point whether the user is a member of an individual service provider including the access point or a member of a parallel service provider that contracts with the plurality of individual service providers, executing user authentication processing by the access point itself when the user is a member of the individual service provider, and connecting the user to a network in accordance with a result of the authentication processing, and causing the parallel service provider to execute user authentication processing by the access point when the user is a member of the parallel service provider, and connecting the user to the network in accordance with a result of the authentication processing.

Preferably, the user who contracts with the parallel service provider sends a connection request containing a domain name of the parallel service provider to the access point, and the access point determines whether the user contracts with the parallel service provider in accordance with presence' or absence of the domain name. The plurality of individual service providers send respective user connection recordings to the parallel service provider.

An electronic mail address determination system according to the present invention, comprises means for, when a user name is input, determining whether an electronic mail address including a combination of the user name and any one of a plurality of predetermined sub-domains has been registered, and means for, when the electronic mail address has been registered, determining an electronic mail address including a combination of the user name and another sub-domain has been registered, whereby setting an electronic mail address including a combination of a sub-domain not registered and a user name.

A network connection device according to the present invention comprises means for, when a connection request is issued from a user, determining whether the user is a regular member of a provider with which the user contracts or a partnership member under a given contract with the provider, means for, when the user is a regular member, executing user authentication processing and connecting the user to a network in accordance with a result of the authentication processing, and means for, when the user is a partnership member, transferring a connection request to a specified authentication server, and executing user authentication processing and connecting the user to the network in accordance with a result of the authentication processing.

Preferably, the partnership member includes a predetermined domain name in the connection request, and the determining means determines whether the user is the partnership member in accordance with presence or absence of the predetermined domain name in the connection request. The specified authentication server is connected to network connection devices of a plurality of companies and used in common.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a diagram showing a mail address of the prior art Internet mail;

DETAILED DESCRIPTION OF THE INVENTION

Hereinafter a network system according to an embodiment of the present invention will be described.

Figure 3:
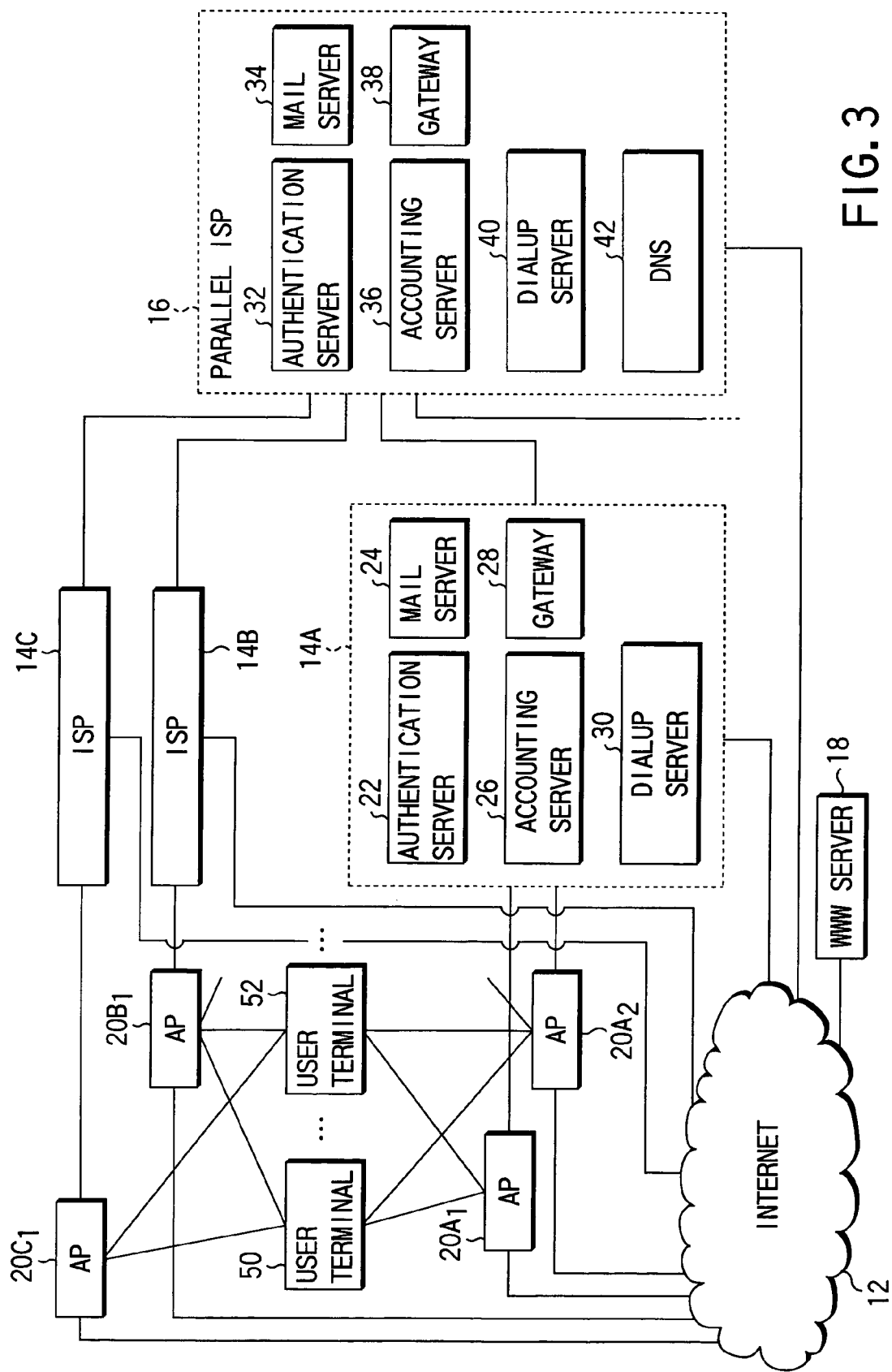
FIG. 3 is a diagram showing a configuration of a network system according to one embodiment of the present invention.

FIG. 3 illustrates a configuration of the Internet according to the embodiment of the present invention.

Access points (APs) $20A_1$, $20A_2$, . . . ; $20B_1$, . . . ; $20C_1$, . . . belonging to Internet service providers (hereinafter referred to as individual ISPs) 14A, 14B, 14C, . . . are connected to the Internet 12. The access points APs have a function of connecting user terminals 50, 52, . . . contracting with the ISPs to the Internet 12 and a roaming function of connecting the user terminals 50, 52, . . . contracting with a parallel Internet service provider (parallel ISP) 16, which will be described later, to the Internet 12. The parallel ISP 16 is the same as the normal ISPs 14A, 14B, . . . except that it has no access points for connection with the Internet. The parallel ISP 16 and normal ISPs 14A, 14B, . . . can be connected to each other by means of the Internet, but it is preferable that they be connected through an exclusive line from a security standpoint. The parallel ISP 16 makes a so-called roaming contract with the individual ISPs 14A, 14B, . . . . This contract contains an agreement that when a user of the parallel ISP 16 uses the access points of the individual ISPs 14A, 14B, . . . , the parallel ISP 16 pays the user charge instead of the user.

The individual ISPs 14A, 14B, . . . include an authentication server 22, a mail server 24, an accounting server 26, a gateway 28, and a dialup server 30, while the parallel ISP 16 does an authentication server 32, a mail server 34, an accounting server 36, a gateway 38, a dialup server 40, and a domain name server (DSN) 42. Though the DSN is also included in the normal ISPs 14A, 14B, . . . , it is not shown because it does not directly relate to the operation of the present invention. Each of the servers is not constituted of one computer, but they can be formed of a single computer. Furthermore, the servers are not located in one place but can be arranged at remote sites and connected to one another through an exclusive line. A WWW server 18 for providing a home page is also connected to the Internet 12. The WWW server 18 can be included in the providers.

An operation of the Internet according to the above embodiment will now be described.

When a user makes use of an Internet service, he or she needs to contract with any of providers first.

The user can make a contract with the individual ISPs 14A, 14B, 14C, . . . as in the case of the prior art; however, the user makes a contract with only the parallel ISP 16 in this embodiment. By contracting with only the parallel ISP 16 as described above, the user can use all access points of the individual ISPs 14A, 14B, 14C, . . . with which the parallel ISP 16 is under roaming contract. For the contract with the parallel ISP 16 (online signup), the parallel ISP 16 also has access points exclusively for signup, though not shown. The programs for the online signup are sent to respective users by means of a media such as a CD-ROM. The users perform various settings according to the programs. For example, a user inputs necessary information such as a user name, an address, a telephone number, the name of a personal computer for use, a desired user name, and a bank account. Since this information is personal secret information, it is desirable that a user can choose the Internet or mail to send the information. The signup for the parallel ISP 16 differs from an ordinary line signup in the selection of an individual ISP (one ISP 14A is selected, but it can be changed at any time) to select an access point for use in connecting with the Internet and how to determine an electronic mail address. User information such as a user ID and a password is stored in the authentication server 32.

Figures 1, 4:
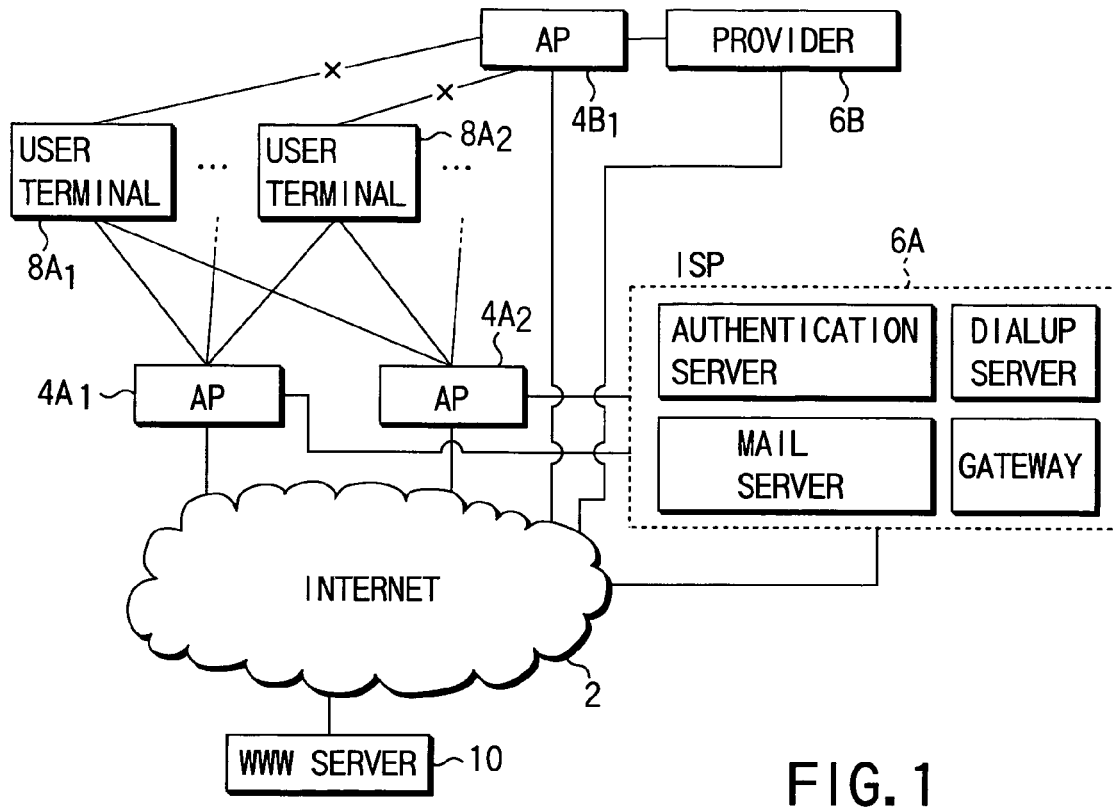
FIG. 1 is a diagram showing a configuration of a prior art Internet system.
FIG. 4 is a diagram showing an example of setting an electronic mail address in the one embodiment of the present invention.

The determination of an electronic mail address will be described with reference to FIG. 4. As is well-known, an electronic mail address is made up of both a user name (ID) and a domain name. The present invention ensures with a considerably high probability that a user name that a user wishes (usually the full name of the user) can be used as a mail address.

In other words, 1296 sub-domains are made up of alphanumerics "00" to "ZZ" under the domain name "PARALLELNET.COM" so as to cope with 1296 duplicate user names. If 1296 sub-domain names are insufficient, the digits of sub-domain names have only to increase to three to cope with 46656 duplicate user names. If the sub-domain names so increase in digit, it is possible to issue electronic mail addresses including user names that a limitless number of users desire.

More specifically, when an electronic mail address is registered with a provider, it is transmitted to the domain name server 42 along with a user name such as "KOJIMA". The domain name server 42 determines whether the electronic mail address adding a domain name (initial value) "00.PARALLELNET.COM" to the user name "KOJIMA" has been already registered or not. If the mail address "KOJIMA@00.PARALLELNET.COM" has not yet been registered, it is done as an electronic mail address of the user, and the use is notified of this address.

When the mail address "KOJIMA@00.PARALLELNET.COM" has been already registered in the domain name server 42, the server 42 determines whether an electronic mail address with the next sub-domain name "01.PARALLELNET.COM" has been registered or not. If it has been done, the server 42 repeats the same determination operation for electronic mail addresses with "02.PARALLELNET.COM," "03.PARALLELNET.COM," . . . in this order until a unique electronic mail address is determined. A user sticks to a user name before @ (at sign) but does not care about a domain name after @ too much. With the above sub-domain name, a user does not fail to have an electronic mail address that he or she desires.

Figure 5:
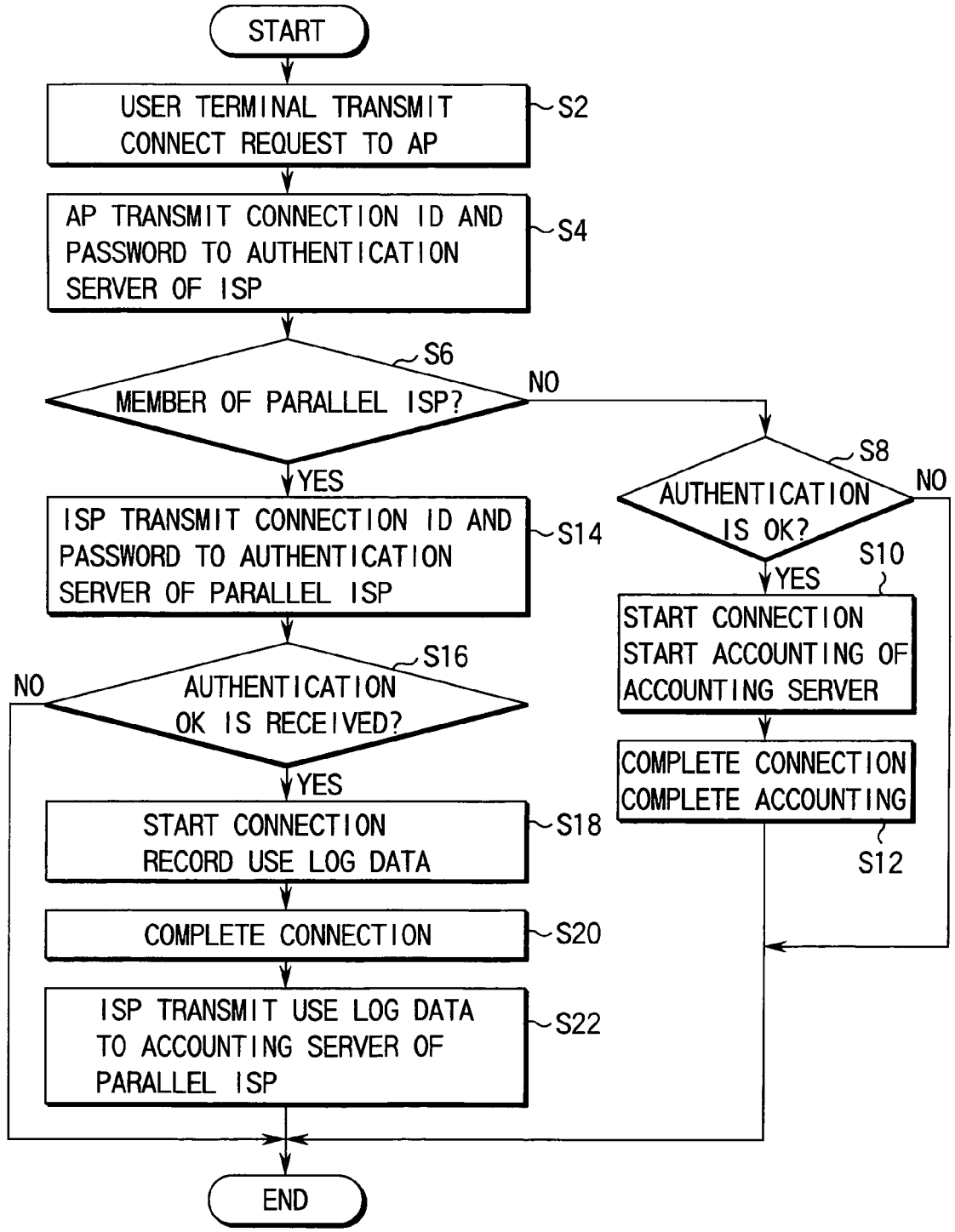
FIG. 5 is a flowchart showing a flow of processing performed in connecting with the Internet in the one embodiment of the present invention.

Referring to the flowchart shown in FIG. 5, the procedure for connecting a user terminal to the Internet will now be described.

In step S2, a request to connect a user terminal (e.g., 50) to an access point (e.g., $20A_1$) of a selected individual ISP (ISP 14A), is made. This request contains a connection ID and a password. As the connection ID (account), an electronic mail address "KOJIMA@00.PARALLELNET.COM" including a domain name is used, unlike in the normal dialup connection.

In step S4, a request (connection ID, password) to connect the access point $20A_1$ to the authentication server 22 of the ISP 14A, is transmitted.

In step S6, the authentication server 22 determines whether the user is a member of the parallel ISP or not according to whether the connection ID includes a suffix (a domain name "PARALLELNET.COM" in this case). If the connection ID includes no suffix, the user is a regular member of own provider and thus the authentication server 22 authenticates the user (confirms that the password is valid). If the authentication indicates NG, the processing is stopped.

If the authentication indicates OK, permission is given to the access point $20A_1$ to connect the user terminal 50 thereto in step S10, and the connection of the user terminal to the Internet is started and so is accounting by the accounting server 26. The user connected to the Internet 12 gains access to charge or free contents, transmits/receives an electronic mail, and does online shopping. Accounting information such as a usage charge of a network and a connection rate of connecting with a charge content, is stored in the accounting server 26. In step S12, the connection is completed, as is the accounting. The accounting information is usually collected every month, an account is issued to a user, and a charge is automatically paid from a user's bank account.

If the connection ID includes a suffix, the user is not a member of own provider but a member of the parallel ISP 16 and thus the authentication server 22 transfers a connection request (connection ID and password) to the authentication server 32 of the parallel ISP 16. This transfer is encrypted. The authentication server 32 of the parallel ISP 16 authenticates a connection request transferred from each of the individual ISPs 14A, 14B, 14C, . . . and returns an authentication result to it.

In step S16, the authentication server 22 of the ISP 14A receives the authentication result. If the result is not good, the processing ends. If it is good, permission is given to the access point $20A_1$ to connect the user terminal 50 thereto in step S18, and the connection of the user terminal to the Internet is started and use log data (user, use time, etc.) is recorded in the accounting server 26. If, in step S20, the connection is completed, the use log data is transferred from the accounting server 26 of the ISP 14A to the accounting server 36 of the parallel ISP 16 in step S22, and the processing ends. As described above, the individual ISPs 14A, 14B, 14C, . . . charge not the user but the parallel ISP 16 for the connection fee.

The accounting server 36 of the parallel ISP 16 sums up the fees of the individual ISPs 14A, 14B, 14C, . . . , charges the users for them, and collects money from the users.

In step S2, when a user makes a request to connect with an access point, the access point (individual ISP) can freely be varied at all times. If, therefore, there are no access points of the commonly-used ISP near the user when he or she is out or on business, the user can temporarily use an access point of another nearby ISP (which is under roaming contract with the parallel ISP). When the commonly-used ISP access point is busy, the use can also temporarily use another ISP access point. Moreover, the user can choose the optimum ISP in accordance with the purpose of using the Internet.

According to the present invention described above, if a user simply makes a contract with a single parallel provider which is under roaming contract in advance with a plurality of individual providers, the user can connect to the Internet selectively using access points of a number of individual providers. The user is not at a loss to find an access point everywhere in the world. The individual providers can freely be selected and thus the optimum provider can be selected in accordance with the purpose of using the Internet, the busy condition of lines of the providers, and the like, which is economical. Since, furthermore, the user contracts with only the parallel provider, he or she need not manage a plurality of accounts or a plurality of e-mail addresses but can do the e-mail in a unified manner. In order to avoid the duplicate user names in determining an electronic mail address, a number of sub-domain names are prepared and one of them can be added to a domain name. In most cases, a user can have an electronic mail address including a user name that the user wishes.

The present invention is not limited to the above embodiment described above, but various changes and modifications can be made. For example, the network of the present invention is not limited to the foregoing system.

According to the present invention described above, there can be provided a network system in which a user is able to connect with a network selectively using access points of a number of Internet service providers only if the user makes a contract with one Internet service provider.

According to the present invention, there can be provided an Internet connection apparatus capable of connecting with a network by performing user authentication even at the request of not only a regular user contracting with a provider but also a user contracting with another provider cooperating with the provider of the regular user.

According to the present invention, there can be provided an electronic mail address determination system capable of providing a user with an electronic mail address including a user name as the user wishes.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A network system comprising:

individual service provider devices (14A, 14B, 14C) each having a first authentication server (22) and access point terminals (20A, 20B, 20C) to which user terminals (50, 52) of users who contract a corresponding one of the individual service provider devices are connected, the access point terminals connecting the user terminal to a network;

a parallel service provider device (16) connected to the network and the individual service provider devices (14A, 14B, 14C), the parallel service provider device having a roaming contract with the individual service provider devices and including a second authentication server (32) and no access point terminal;

wherein each of the individual service provider devices (14A, 14B, 14C) comprises:

determining means for determining (S6) whether a user who issues a connection request from a user terminal connected to one of the access point terminals is a contracted member of the parallel service provider device;

transmitting means for transmitting (S14) the connection request to the parallel service provider device (16) to cause the second authentication server (32) of the parallel services provider device (16) to perform user authentication when the user is the contracted member;

authentication means for causing the first authentication server (22) of the individual service provider devices (14A, 14B, 14C) to perform user authentication (S8) when the user is not the contracted member;

connecting means for connecting the user terminal connected to one of the access point terminals to the network and charging the user for connection when a result of user authentication is good (S10, S18), said parallel service provider device comprising:

receiving means for receiving a user name for a user terminal of a user who requests a signup; and further determining means for determining whether e-mail addresses including a combination of the input user name and sub-domains of the parallel service provider device has been registered so as to register one of non-registered e-mail addresses.

2. The network system according to claim 1, wherein the connection request comprises an e-mail address including a domain name of the parallel service provider device, and the determining means determines whether the user is a contracted member based on the presence or absence of the domain name of the parallel service provider device in the connection request.

3. The network's system according to claim 1, wherein the parallel service provider device is connected to the individual service provider devices through an exclusive line.

4. The network system according to claim 1, wherein the individual service provider devices send respective user connection logs to the parallel service provider device.

* * * * *